(12) United States Patent
Arbel et al.

(10) Patent No.: US 8,453,470 B2
(45) Date of Patent: Jun. 4, 2013

(54) METHOD AND SYSTEM FOR HEATING AND DEHUMIDIFYING

(75) Inventors: Avraham Arbel, Ramat-HaSharon (IL); Mordechai Barak, Mazkeret Batia (IL); Alexander Shklyar, Jerusalem (IL)

(73) Assignee: The State of Israel, Ministry of Agriculture & Rural Development, Agricultural Research Organization, (A.R.O.), Volcani Center, Beit-Dagan (IL)

( * ) Notice: Subject to any disclaimer, the term of this patent is extended or adjusted under 35 U.S.C. 154(b) by 266 days.

(21) Appl. No.: 12/741,594

(22) PCT Filed: Nov. 5, 2008

(86) PCT No.: PCT/IL2008/001449
§ 371 (c)(1),
(2), (4) Date: May 6, 2010

(87) PCT Pub. No.: WO2009/060436
PCT Pub. Date: May 14, 2009

(65) Prior Publication Data
US 2010/0257878 A1    Oct. 14, 2010

Related U.S. Application Data

(60) Provisional application No. 60/996,266, filed on Nov. 8, 2007.

(51) Int. Cl.
*F25D 17/06*    (2006.01)
(52) U.S. Cl.
USPC .............................................. 62/93; 621/271

(58) Field of Classification Search
USPC .................. 62/93, 95, 271, 272, 498; 165/59, 165/222; 261/DIG. 32, DIG. 34
See application file for complete search history.

(56) References Cited

U.S. PATENT DOCUMENTS

| | | | |
|---|---|---|---|
| 4,297,813 A | | 11/1981 | Farrell et al. |
| 4,305,235 A | * | 12/1981 | Roston ........................... 52/2.17 |
| 4,567,732 A | | 2/1986 | Landstrom et al. |
| 4,685,617 A | * | 8/1987 | Assaf ............................... 237/81 |
| 4,742,475 A | * | 5/1988 | Kaiser et al. ................... 700/278 |
| 4,745,963 A | * | 5/1988 | Assaf ............................... 165/60 |
| 4,981,021 A | * | 1/1991 | Assaf ............................... 62/271 |
| 4,995,242 A | | 2/1991 | Assaf |
| 5,097,895 A | * | 3/1992 | Assaf ........................ 165/104.14 |

(Continued)

FOREIGN PATENT DOCUMENTS

| | | |
|---|---|---|
| CN | 86103548 | 1/1987 |
| WO | WO 2009/060436 | 5/2009 |

OTHER PUBLICATIONS

International Search Report Dated Mar. 9, 2009 From the International Searching Authority Re.: Application No. PCT/IL2008/001449.

(Continued)

*Primary Examiner* — Mohammad Ali

(57) ABSTRACT

A method of controlling the conditions of air in an interior of an enclosure is disclosed. The method comprises collecting air from a lower part of the interior, dehumidifying the collected air, and releasing the dehumidified air in an upper part of the interior, thereby controlling the conditions of the air in the interior of the enclosure.

19 Claims, 11 Drawing Sheets

U.S. PATENT DOCUMENTS

| | | | | |
|---|---|---|---|---|
| 5,392,611 | A | 2/1995 | Assaf et al. | |
| 6,463,750 | B2* | 10/2002 | Assaf | 62/271 |
| 6,490,874 | B2* | 12/2002 | Chu et al. | 62/93 |
| 2004/0194371 | A1* | 10/2004 | Kinnis | 47/17 |
| 2005/0005528 | A1* | 1/2005 | Brault et al. | 52/63 |
| 2006/0059772 | A1* | 3/2006 | Brault et al. | 47/17 |

OTHER PUBLICATIONS

Written Opinion Dated Mar. 9, 2009 From the International Searching Authority Re.: Application No. PCT/IL2008/001449.

Notice of Acceptance Dated Mar. 23, 2011 From the Intellectual Property Office of South Africa Re. Application No. 2010/03995.

Response Dated Apr. 14, 2011 to Notice of Acceptance of Mar. 23, 2011 From the Intellectual Property Office of South Africa Re. Application No. 2010/03995.

Translation of Office Action Dated Jul. 25, 2012 From the State Intellectual Property Office of the People's Republic of China Re. Application No. 200880124364.3.

Office Action of the Substantive Examination Dated Jul. 31, 2012 From the Eurasian Patent Office Re. Application No. 201000759 and Its Summary in English.

International Preliminary Report on Patentability Dated May 24, 2010 From the International Preliminary Examining Authority Re.: Application No. PCT/IL2008/001449.

\* cited by examiner

METHOD AND SYSTEM FOR HEATING AND DEHUMIDIFYING

RELATED APPLICATIONS

This Application is a National Phase of PCT Patent Application No. PCT/IL2008/001449 having International filing date of Nov. 5, 2008, which claims the benefit of U.S. Provisional Patent Application No. 60/996,266 filed on Nov. 8, 2007. The contents of the above Applications are all incorporated herein by reference.

FIELD AND BACKGROUND OF THE INVENTION

The present invention, in some embodiments thereof, relates to a method and system for dehumidifying the interior of an enclosure and, more particularly, but not exclusively, to a method, apparatus and system for dehumidifying the interior of greenhouse enclosures in which plants are grown.

Greenhouses require that the air within it be controlled with respect to temperature and humidity in order to ensure that foliage temperature and transpiration rates are such as to maintain dry foliage and plant health. High humidity, especially free water on the plant foliage, promotes the development of foliar diseases, such as tomato blight, gray mould and downy mildews in various crops. These diseases inflict great harm on the crops, substantially reduce crop yield, and severely impair product quality. While pesticides are used to control these diseases, their use is limited for a number of reasons. Their use promotes pesticide resistance to many pathogens, and general governmental policy is to phase-out the use of some pesticides or to limit their use. Many consumers demand products having no pesticide residue. In addition, the use of such pesticides may unfavorably affect other environmental considerations.

Replacing the greenhouse air with external air is a customary method for decreasing the humidity in a greenhouse, and thereby the risk of producing free water on the foliage. External cold air, with low absolute humidity, replaces the warmer greenhouse air and absorbs the excess water that evaporates. Such a method, however, is very wasteful of energy.

SUMMARY OF THE INVENTION

According to an aspect of some embodiments of the present invention there is provided a method of controlling the conditions of air in an interior of an enclosure, comprising collecting air from a lower part of the interior, dehumidifying the collected air, and releasing the dehumidified air in an upper part of the interior, thereby controlling the conditions of the air in the interior of the enclosure.

According to some embodiments of the invention the method further comprises reducing or preventing transport of thermal energy through an overhead wall of the enclosure.

According to some embodiments of the invention the reducing or preventing comprises reducing or preventing transport of the thermal energy by convection.

According to some embodiments of the invention the reducing or preventing comprises reducing or preventing transport of the thermal energy by conduction.

According to some embodiments of the invention the reducing or preventing comprises reducing or preventing transport of the thermal energy by radiation.

According to some embodiments of the invention the method further comprises reflecting thermal radiation off a thermal screen overlaying the interior beneath the overhead wall.

According to some embodiments of the invention the method further comprises heating the dehumidified air prior to the release of the air in the upper part of the interior.

According to some embodiments of the invention the dehumidifying comprises using a dehumidifying unit circulating a refrigerant fluid therein, the unit having an evaporator at which the refrigerant fluid is evaporated and a condenser at which the refrigerant fluid is condensed, wherein the air is cooled and dehumidified by the evaporator and heated by the condenser.

According to an aspect of some embodiments of the present invention there is provided apparatus for controlling the conditions of air in an interior of an enclosure, comprising, an air inlet constituted for collecting air from a lower part of the interior, a dehumidifying unit for dehumidifying the collected air, and an air outlet constituted for releasing the dehumidified air in an upper part of the interior.

According to an aspect of some embodiments of the present invention there is provided a greenhouse system, comprising the apparatus described herein and an enclosure having an interior being at least partially isolated from the environment, wherein the apparatus is positioned within the interior.

According to an aspect of some embodiments of the present invention there is provided a greenhouse system, comprising a plurality of apparatus described herein and an enclosure having an interior being at least partially isolated from the environment, wherein the apparatus are deployed within the interior.

According to some embodiments of the invention the apparatus is positioned at the upper part of the interior.

According to some embodiments of the invention the enclosure comprises a thermal screen overlaying the enclosure and being constituted for reducing or preventing transport of thermal energy through the thermal screen.

According to some embodiments of the invention the thermal screen is sealed for penetration of air therethrough so as to reduce or prevent transport of the thermal energy by convection.

According to some embodiments of the invention the thermal screen is made of thermally insulating material so as to reduce or prevent transport of the thermal energy by conduction.

According to some embodiments of the invention the thermal screen is opaque to thermal radiation so as to reduce or prevent transport of the thermal energy by radiation.

According to some embodiments of the invention the thermal screen is thermally reflective so as to reflect thermal radiation.

According to some embodiments of the invention the interior is devoid of heat sources at the lower part.

According to some embodiments of the invention the air is collected and released so as to maintain, at all times, an average temperature which is lower at the lower part than at the upper part.

According to some embodiments of the invention the dehumidifying unit circulates a refrigerant fluid therein and comprises an evaporator at which the refrigerant fluid is evaporated and a condenser at which the refrigerant fluid is condensed, wherein the collected air is dehumidified and cooled by the evaporator, and wherein the dehumidified and cooled air is heated by the condenser.

According to some embodiments of the invention the dehumidifying unit is a heating and dehumidifying unit which comprises a heat exchanger for heating the dehumidified air prior to the release of the air in the upper part of the interior.

According to some embodiments of the invention the heat exchanger is a liquid-type heat exchanger.

According to some embodiments of the invention the dehumidifying unit is housed within a common housing.

According to some embodiments of the invention the air is circulated from the interior of the enclosure though the dehumidifying unit by means of a fan positioned in the unit.

According to some embodiments of the invention the dehumidifying unit is housed in a housing which comprises an outwardly-flaring inlet, an outwardly-flaring outlet, and an interconnecting relatively narrow throat, the outwardly-flaring inlet housing the evaporator and the condenser, and the narrow throat housing the fan.

According to some embodiments of the invention the air is circulated from the interior of the enclosure though the heating and dehumidifying unit by means of a fan positioned in the unit.

According to some embodiments of the invention the fan is positioned for receiving air flowing away from the heat exchanger and blowing the air through the air outlet.

According to some embodiments of the invention the fan is interposed between the condenser and the heat exchanger, such that the fan receives air flowing away from the condenser and the heat exchanger receives air flowing away from the fan.

According to some embodiments of the invention a refrigerant fluid exiting the condenser is further cooled by air between the evaporator and the condenser.

According to some embodiments of the invention wherein air from the enclosure entering the evaporator is pre-cooled by air between the evaporator and the condenser.

According to some embodiments of the invention wherein the dehumidified air is mixed with air from the enclosure to provide a mixture, and wherein the mixture is heated by the heat exchanger.

According to some embodiments of the invention wherein the enclosure is a greenhouse for growing plants, and wherein the air is released above the foliage of the plants.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a method and system for dehumidifying the interior of an enclosure and, more particularly, but not exclusively, to a method, apparatus and system for dehumidifying the interior of greenhouse enclosures in which plants are grown.

Figure 1:
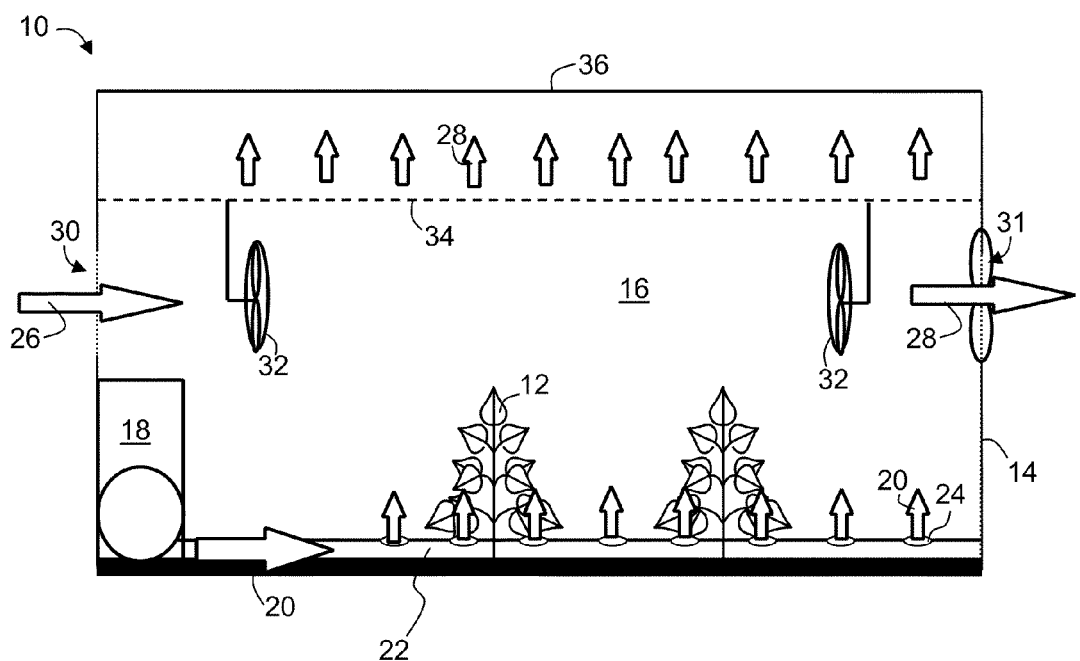
FIG. 1 is a schematic illustration of a greenhouse.

For purposes of better understanding some embodiments of the present invention, as illustrated in FIGS. 2-6 of the drawings, reference is first made to the construction and operation of a greenhouse 10 for growing plants 12 as illustrated in FIG. 1.

Greenhouse 10 includes side walls 14 and an overhead wall 36 defining the interior 16 of the greenhouse. Walls 14 are typically formed with openings 30 and 31. A heating unit 18 supplies warm air 20 to an arrangement of conduits 22 arranged at or near ground level and generally below the level of the foliage of plants 12. Openings 24 in conduits 22 allow warm air 20 to exit conduits 22 upwards into interior 16 for heating interior 16. During heating the air interior humidifies and water vapors tend to condense on the foliage, resulting in the development of foliar diseases such as tomato blight (caused by *Phytophthora infestans*) gray mold (caused by *Botrytis cinerea*), and downy mildews in various crops.

To prevent condensation of water on the foliage, a ventilation procedure is employed, whereby environmental air 26 enters the interior of the greenhouse and replaces humid air 28. The ventilation is facilitated by means of one or more fans 31 positioned in walls 14. Additionally, one or more fans 32 circulate the air within interior 16. The environmental air which is typically cold and with low absolute humidity (water vapor content) replaces the warmer greenhouse air and absorbs the excess water that evaporates. Additionally, greenhouse 10 includes a permeable or semi-permeable screen 34 overlaying interior 16 beneath overhead wall 36, which allows further reduction of humidity by evacuating part of humid air 28 out through screen 34 and the water vapor condensed on overhead wall 36.

It was found by the inventors of the present invention that while the above solutions may partially reduce the humidity within interior 16, they are far from being optimal. This is because exchange of air with the exterior of greenhouse 10 (either through openings 30 in wall 14 or through overhead wall 36) causes substantial heat losses which have to be compensated by supplying more energy to heating unit 18. In the context of the current increasing trend in fuel prices, the cost of heating has become a main component of greenhouse inputs. Therefore, the additional energy required to compensate heat loses due to ventilation substantially decrease the profit margin.

While conceiving the present invention it has been hypothesized and while reducing the present invention to practice it has been realized that the an interior of an enclosure can be dehumidified and optionally heating in an energy saving manner.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
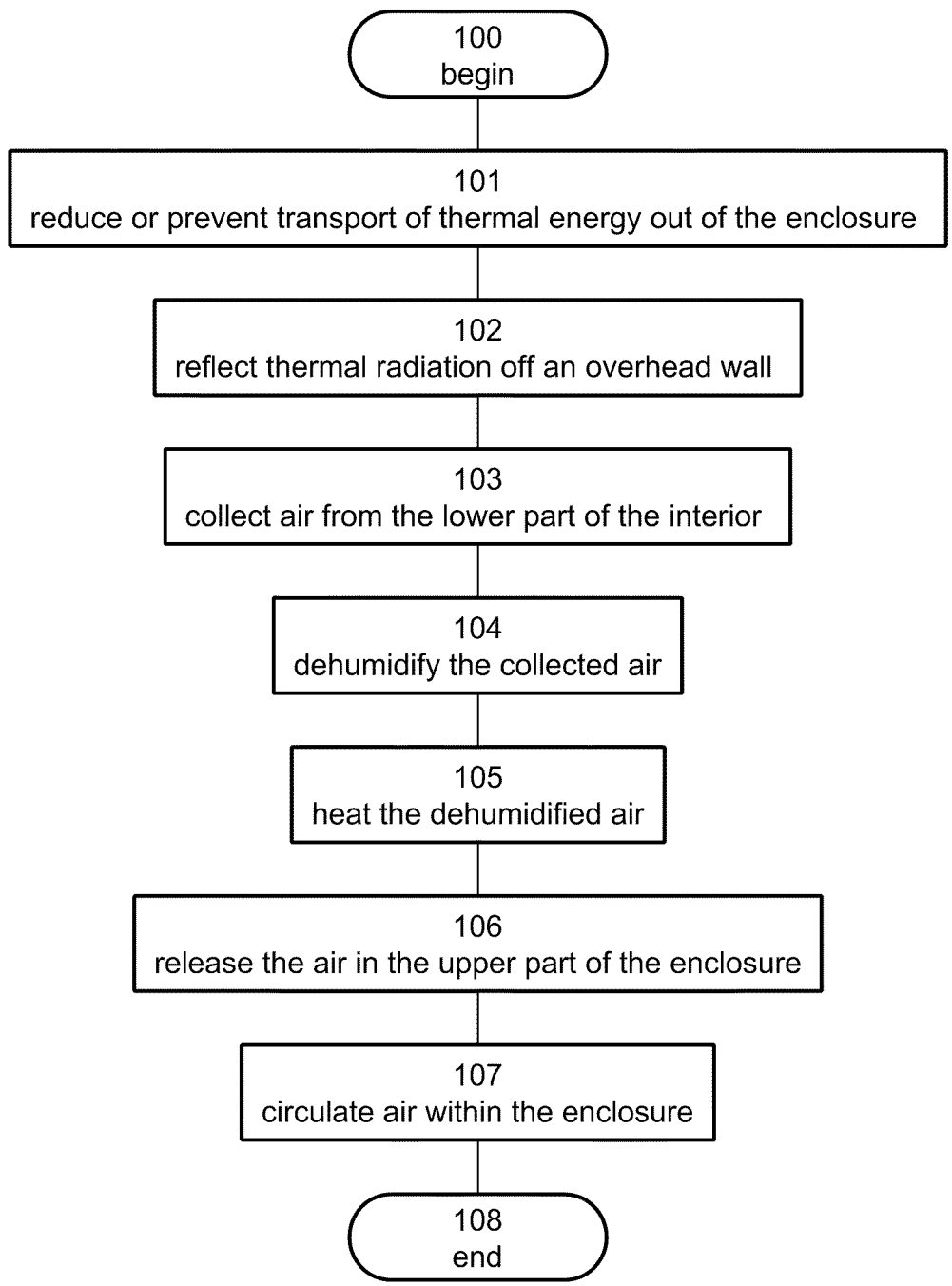
FIG. 2 is a flowchart diagram of a method suitable for controlling the condition of air in interior of an enclosure, according to various exemplary embodiments of the present invention.

Reference is now made to FIG. 2 which is a flowchart diagram of a method suitable for controlling the condition of air in interior of an enclosure (e.g., a greenhouse), according to various exemplary embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below (e.g., one or more of the operations in blocks 101, 102, 105 and 107 of FIG. 2) are optional and may not be executed.

The method of the present embodiments begins at 100 and, optionally and preferably, continues to 101 at which transport of thermal energy through the side walls and/or overhead wall of the enclosure is reduced (e.g., minimized) or prevented. This can be achieved by closing openings formed in the side walls or providing the enclosure with side walls which are devoid of such openings. In various exemplary embodiments of the invention the overhead wall of the enclosure is made non-permeable to air and water vapor. In various exemplary embodiments of the invention a thermal screen overlays the interior of the enclosure beneath the overhead wall so as to improve the thermal isolation of the interior from the environment.

The reduction or prevention of thermal energy transport is preferably with respect to at least one type of transport selected from the group consisting of convection, conduction and radiation. More preferably, the reduction or prevention is with respect at least two, e.g., all types of thermal transport.

Reduction or prevention of transport by convection can be achieved by reducing, more preferably eliminating, ventilation. In this embodiment, the side walls, overhead wall and/or thermal screen is/are sealed for penetration of air and water vapor therethrough. Reduction or prevention of transport by conduction can be achieved using side walls, overhead wall and/or thermal screen that is/are made of thermally insulating material. Reduction or prevention of transport by conduction can be achieved using side walls, overhead wall and/or thermal screen that is/are opaque to thermal radiation, which is typically at very long wavelengths (e.g., about 10,000 nm or above). In these embodiments a thermal screen can be employed as further detailed hereinafter.

In various exemplary embodiments of the invention the method optionally and preferably continues to 102 at which thermal radiation generated within the enclosure is reflected off the thermal screen. This can be achieved using a thermal screen that is made thermally reflective. The reflection of thermal radiation is particularly useful when objects within the enclosure (e.g., foliage) are at a temperature which is higher than the temperature of the thermal screen. In such cases, the warmer objects emit thermal radiation which is reflected by the thermally reflective screen back into the interior of the enclosure. When the temperature of the thermal screen is higher than the temperature of the objects within the enclosure, the thermal radiation is typically emitted by the thermal screen (rather than reflected thereby).

The method continues to 103 at which air is collected from a lower part of the interior. For example, when the enclosure is a greenhouse for growing plats, the air is typically collected from a height level which is below the average height level of the foliage. It is to be understood that although air from the lower part is collected, the collection is not necessarily performed at the lower part of the enclosure. For example, in some embodiments of the present invention the collection of air is done by generating air flow from the lower part of the interior upwards into an air inlet positioned at the upper part of the interior (e.g., above or at the average height level of the foliage). Yet, embodiments in which the air is collected at the lower part of the greenhouse (e.g., using an air inlet located at the lower part) are also contemplated.

The method continues to 104 at which the collected air is dehumidified.

As used herein, dehumidification is a process in which the water content of the air is reduced, but not necessarily minimized or nulled. Thus, a "dehumidified air" as used herein is an air which has lower water content relative to its water content prior to the dehumidification. For example, when the enclosure is a greenhouse for growing plants, the dehumidification is done such as to minimize or eliminate condensation on the foliage while ensuring a sufficiently high humidity at the vicinity of the foliage. Representative example of suitable conditions at the vicinity of the foliage is, without limitation, a temperature of about 18° C. and relative humidity of about 80%.

In various exemplary embodiments of the invention the dehumidification is effected by a refrigerant circuit which generates a thermal cycle. In these embodiments, a refrigerant fluid is circulated between an evaporator at which the refrigerant fluid is evaporated and a condenser at which the refrigerant fluid is condensed. The thermal cycle of the circuit will now be explained.

The thermal energy which is required for the evaporation of the refrigerant fluid within the evaporator is supplied by the air passing the evaporator. As a result, the collected air, which carries water vapor (emitted, e.g., from the foliage and the ground), cools off while passing at the evaporator, and at least part of the air's water vapor content is condensed. The condensed water is drained and the air is dehumidified. The condensation of the refrigerant fluid releases heat which in turn is transferred to the dehumidified and cooled air passing at the condenser. Thus, the air is cooled and dehumidified by the evaporator and reheated by the condenser.

In various exemplary embodiments of the invention the method continues to 105 at which the dehumidified air is further heated using a heat exchanger, as further detailed hereinafter.

The method continues to 106 at which the air, after being dehumidified and optionally further heated, is releasing in an upper part of the enclosure, so as to heat and dehumidify the interior of the enclosure. Thus, the method of the present embodiments operates as a heat pump which collects humid air from the lower part of the enclosure and releases dryer and optionally warmer air at the upper part of the enclosure. At 107 the method optionally and preferably circulates the air within the enclosure, e.g., for better distributing the warmer and dryer air in the vicinity of the foliage.

The method ends at 108.

Before providing a further detailed description of some embodiments of the present invention, attention will be given to the advantages and potential applications offered thereby.

The present embodiments offer an innovative solution of the problem of excess humidity in an enclosure while substantially decreasing the energy consumption by combining heating, dehumidifying and thermal insulating of the of the enclosure. Some embodiments of the present invention are useful for reducing humidity in enclosures which are already heated by other means, such as, for example, by means conduits arranged at or near ground level as described above with reference to FIG. 1.

The use of a heat pump within the enclosure allows the air which is initially cooled to be reheated by supplying it with the heat removed during the dehumidification plus external energy which is required to drive the thermal cycle. The present embodiments thus provide a process in which energy is converted from latent heat (water vapor condensation) into sensible heat (increase in air temperature) with minimal or no thermal losses to the environment. The energy consumption of this process is lower than the energy consumption of traditional techniques since some of the energy is recycled during the process.

The present embodiments can also enhance returns of fuel usage. It is recognized that the generation of electricity is accompanied by the generation of heat. In various exemplary embodiments of the invention the electricity required for the operation of the refrigerant circuit is produced using an electric generator positioned in proximity to or within the interior of enclosure, and the heat produced by the generator is used for further heating the air in the interior of the enclosure. This can be done, for example, be employing conduits filled with fluid (gas or liquid) for evacuating the heat from the generator and release it at the upper part of the enclosure.

In some embodiments of the present invention the fuel used for the generation of electricity is selected such that one of its combustion by-products is carbon dioxide. In these embodiments, the carbon dioxide, or at least a portion thereof, is release into the interior of the greenhouse for facilitating growth of the plants therein. The improved use of fuel according to the present embodiments is also beneficial from the standpoint of environmental consideration. Such use may reduce global warming by decreasing fuel usage and/or reducing the emission of $CO_2$ into the atmosphere.

Implementation of the present embodiments for dehumidifying, heating and/or enriching the $CO_2$ content of a greenhouse can generate appropriate growing conditions for the plants in greenhouse while reducing the amount of fuel consumption. This improves the growth and allows the grower to increase his or her profitability.

The method of the present embodiments is preferably executed at times when there is no possibility of using the natural resources, e.g., replacing the internal air with external air, for drying and removing excess humidity, and/or while heating is required. In such cases, when it is desired to close the enclosure, the dehumidification operation is preferably activated first in a steady and continuous manner. The heat pump converts the air latent heat into sensible heat and adds energy to the air which approximately equals the electric energy invested in operating the cooling cycle. The heating operation can be activated in a varied manner, as necessitated by the environmental conditions, the thermal insulation of the enclosure and the desired conditions within the enclosure.

The operations described above can be monitored in order to obtain the desired temperature and humidity conditions. Specifically, the dehumidification is preferably in accordance with the relative humidity, and the heating process is preferably in accordance with the temperature of the air. When the desired conditions are steady, the evaporative flux is generally constant and therefore the method can be executed continuously and under a constant load.

A typical Coefficient Of Performance (COP) of the basic dehumidification cycle of the present embodiments described above is, without limitation, from about 5 to about 12.

Figure 3:
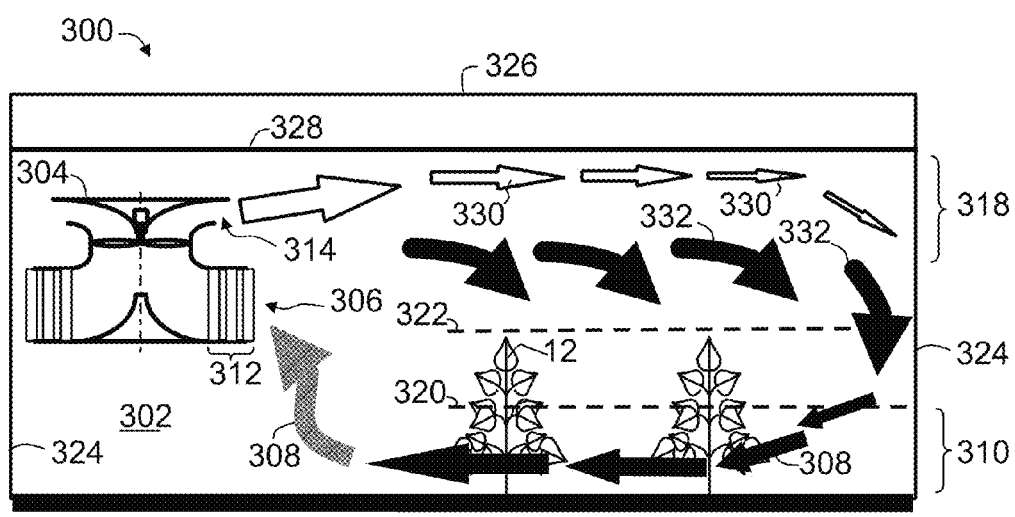
FIG. 3 is a schematic illustration of an enclosure in which the method according to some embodiments of the present invention is employed.

FIG. 3 is a schematic illustration of an enclosure 300 having an interior 302 in which the method according to some embodiments of the present invention is employed. The method can be executed by an apparatus 304 which comprises an air inlet generally shown at 306. Inlet 306 is constituted for collecting air 308 from a lower part 310 of interior 302. Apparatus 304 further comprises a dehumidifying unit 312 for dehumidifying the collected air, and an air outlet 314 constituted for releasing the dehumidified air 330 in an upper part 318 of interior 302. Optionally and preferably dehumidifying unit 312 is a dehumidifying and heating unit which heats the air subsequently to the dehumidification as further detailed hereinunder. Apparatus 304 can be positioned in upper part 318 and configured to generate air flow from lower part 310 generally upwards (e.g., by generating under pressure at inlet 306) so as to allow collection of air 308. Alternatively, apparatus 304 can extend over both portions of interior 302 such that inlet 306 is at lower part 310 while outlet 314 is at upper part 318.

In the schematic illustration of FIG. 3 enclosure 300 is shown as a greenhouse for growing plats 12. In this embodiment, lower part 310 is preferably defined as the part which is below the average foliage level of plants 12, and upper part 318 is preferably defined as the part which is above the maximal foliage level of plants 12. The average foliage level and maximal foliage level are shown in FIG. 3 as dashed lines 320 and 322, respectively.

The walls of enclosure 300 are preferably designed and constructed so as to reduce or prevent thermal losses, as further detailed hereinabove. In various exemplary embodiments of the invention the walls are devoid of openings, or they are formed with closable openings (not shown). The side walls 324 and/or overhead wall 326 are preferably sealed for penetration of air therethrough. Side walls 324 and/or overhead wall 326 can also be made of a thermally isolating material. Additionally or alternatively, side walls 324 and/or overhead wall 326 is/are opaque to thermal radiation.

In various exemplary embodiments of the invention enclosure 300 comprises a thermal screen 328 for improving isolation of interior 302 from the environment. Screen 328 is preferably opaque to thermal radiation. In some embodiments of the present invention thermal screen is a thermally reflective so as to reflect thermal radiation back into interior 302, as further detailed hereinabove. For example, interior 302 can be overlaid by a double-walled, e.g., inflated, sealed structure having thermally reflective screen 328 attached to or integrated with the surface of the structure facing interior 302. It is appreciated that such construction is contrary to the traditional trend in the field of greenhouse constructions, whereby a permeable or semi-permeable screen is employed as further detailed hereinabove.

In various exemplary embodiments of the invention at least one of the walls of enclosure, preferably most or all of the walls is transmissive to sunlight, so as to permit the inwardly-directed sunlight to penetrate the walls.

The distribution of air within interior 302 according to some embodiments of the present invention is illustrated in FIG. 3 by thick arrows. The dehumidified and optionally heated air is shown by empty block arrows 330. As shown, air 330 is outletted via outlet 314 towards screen 328, and is then reflected towards plants 12 at the lower part of the enclosure. In such an arrangement air 330 prevents or at least reduces the accumulation of condensed water on the inner face of screen 328. Thus the humidity at upper part 318 of interior is relatively low.

While flowing at the vicinity of screen 328, the air transmits heat to screen 328, cools off and begins to descent, creating vacancy to more warm air from outlet 314. The partially cooled air is shown by black arrows 332. The temperature of the air at the outlet 314 is preferably selected above the desired temperature at the middle part of the interior such that the partial cooling process brings the air to the desired temperature. For example, when enclosure is a greenhouse for growing plants the temperature of air 332 at the average foliage level 320 can be about 17-19° C., and the temperature of air 330 at outlet 314 is above 20° C. Since air 330 comes from a region in which the humidity is relatively low, air 330 prevents or reduces the accumulation of condensed water on the foliage of plants 12. While passing at the foliage, air 330 collects water vapor (latent heat) and supplies sensible heat. Thus, air 330 is being cooled off. The cooling process of the air continues while the air continues its descending. The cold air at lower part 310 is shown by patterned arrows 308.

Since inlet 306 generates at its vicinity airflow from lower part 310 upwards, circulation occurs, whereby at locations relatively distant from apparatus 304 air 308 at lower part 310 flows in the direction of apparatus 304. Another contribution to the circulation is the flow of air 314 via outlet 314 away from apparatus 304. Since air 308 is colder than air 332 the motion of air 308 is mainly along the horizontal direction, in particular at regions which are relatively distant from apparatus 304. In turn, air 332 continues its cooling and descending.

Figure 4A:
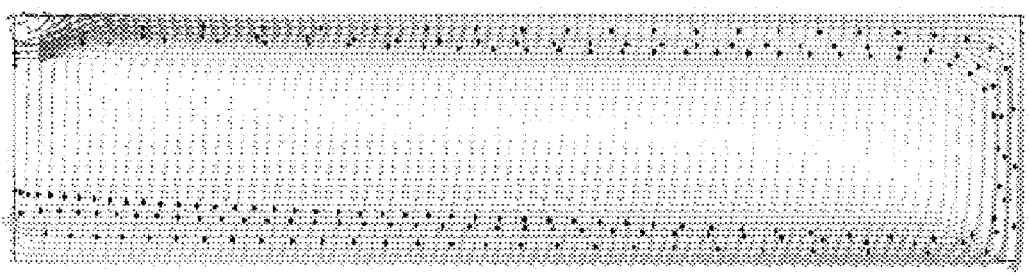
FIGS. 4A-B show velocity distribution (FIG. 4A) and temperature distribution (FIG. 4B) as obtained by computer simulations performed according to various exemplary embodiments of the present invention.
Figure 4B:
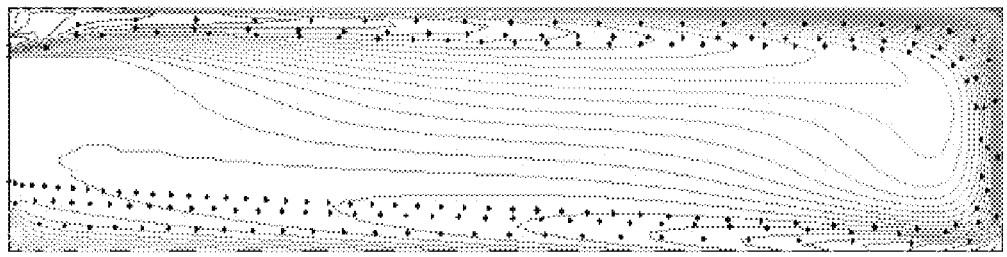

FIGS. 4A-B show velocity distribution (FIG. 4A) and temperature distribution (FIG. 4B) as obtained by computer simulations performed by the Inventors of the present invention. In FIGS. 4A-B, red lines correspond to higher temperature and velocity, and green lines correspond to lower temperature and velocity. As shown, in FIG. 4B, the temperature of the air at the lower part is lower than the temperature of the air at the upper part. Similar effect is shown in FIG. 4A, the velocity of the air at the lower part is generally lower than the velocity of the air at the upper part.

The construction of apparatus 304, according to some embodiments of the present invention is illustrated in FIGS. 5A-G.

Apparatus 304 preferably comprises a housing 340, having an outwardly-flared inlet section 342 at one end (the lower end), an outwardly-flared outlet section 344 at the opposite end, and a relatively narrow throat 346 interconnecting the inlet and outlet ends. In some embodiments of the present invention a common housing is employed, whereby all elements of apparatus 304 are within the same housing. In other embodiments, more than one housing is employed, for example, a dehumidifying unit can be introduced into one housing, and a heating unit can be introduced in another housing. Also contemplated, are configurations in which outwardly-flared inlet section 342 is in one housing and outwardly-flared outlet section 344 is in another housing.

Such a housing configuration may be produced by providing a housing having a lower end of generally cylindrical shape to define inlet section 342, and tapering to a small diameter at an intermediate portion to define throat 346, and then tapering to a slightly larger diameter towards the upper end to define the outlet section 344; and providing a conical baffle 348 at its lower end, and another smaller, conical baffle 350 at its upper end. Inlet section 342 inlets air 308 from the interior of the enclosure, while outlet section 344 returns air back to the enclosure, after the air passing through the housing has been treated by various devices within the housing in order to control its condition such as temperature and humidity.

Outwardly-flared inlet section 342 of housing 340 houses dehumidifying unit 312. In various exemplary embodiments of the invention unit 312 comprises an evaporator 350 and a condenser 352. Evaporator 350 and condenser 352 constitute a heat-pump including a refrigerant fluid (not shown) circulated therethrough via an expansion valve 345 for reducing the pressure of the refrigerant fluid, and a compressor 356, driven by an external motor (not shown), for pressurizing the refrigerant fluid fed to condenser 352. Evaporator 350 is thus effective to receive air inletted from the enclosure via inlet section 342, to cool the inletted air, and to cause condensation of water therein, as further detailed hereinabove. At least part of the water vapor condenses on the outer surface of evaporator 350 for drainage, via outlet drain 358, from housing 340 and optionally also from enclosure 300 (not shown, see FIG. 3). Condenser 352 is effective to receive the cooled and dehumidified air 360 from evaporator 350 for reheating of the air as further detailed hereinabove. The dehumidified air flowing away from condenser 352 is shown at 364.

Figure 5A:
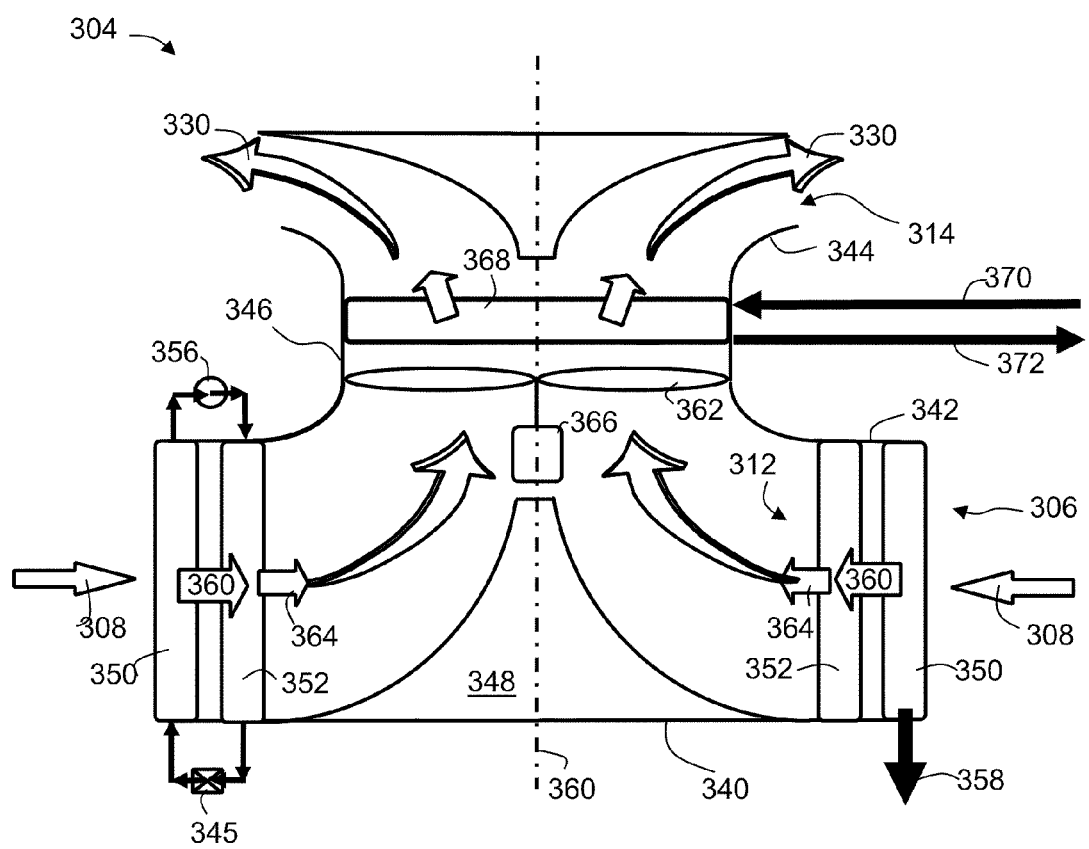
FIGS. 5A-G are schematic illustration of apparatus for controlling the condition of air in interior of an enclosure, according to various exemplary embodiments of the present invention.
Figure 5B:
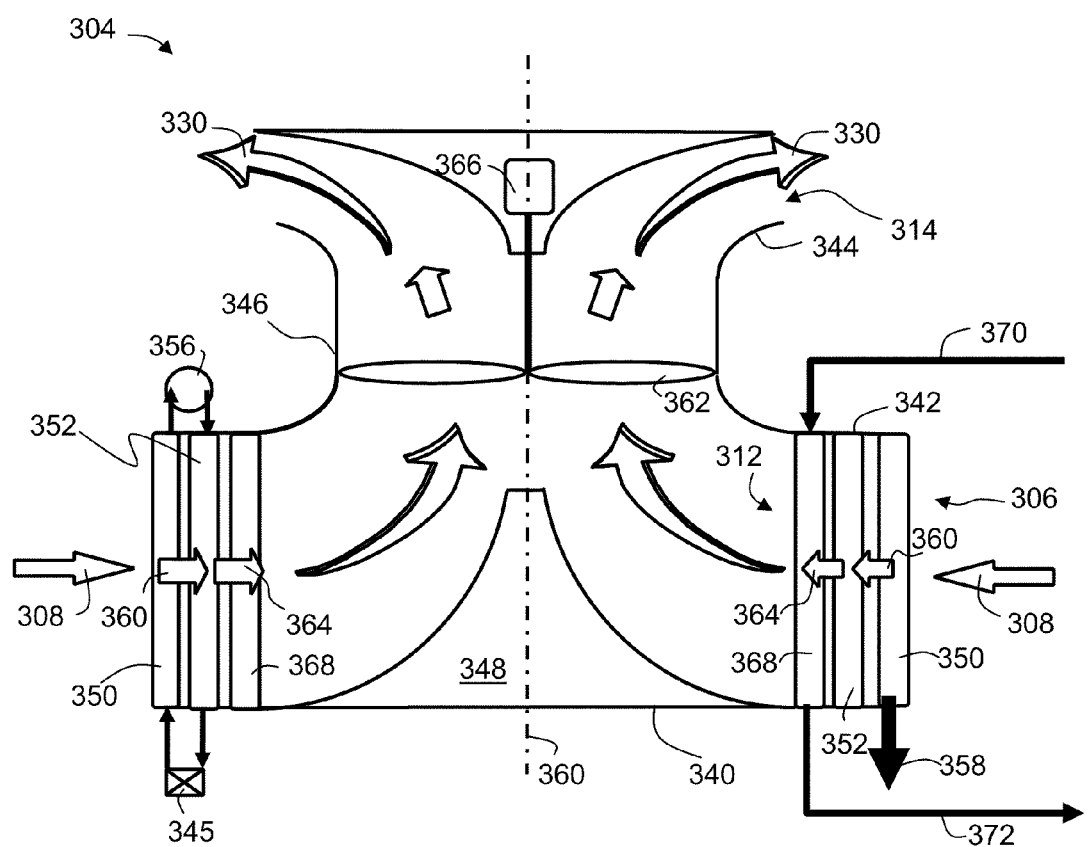
Figure 5C:
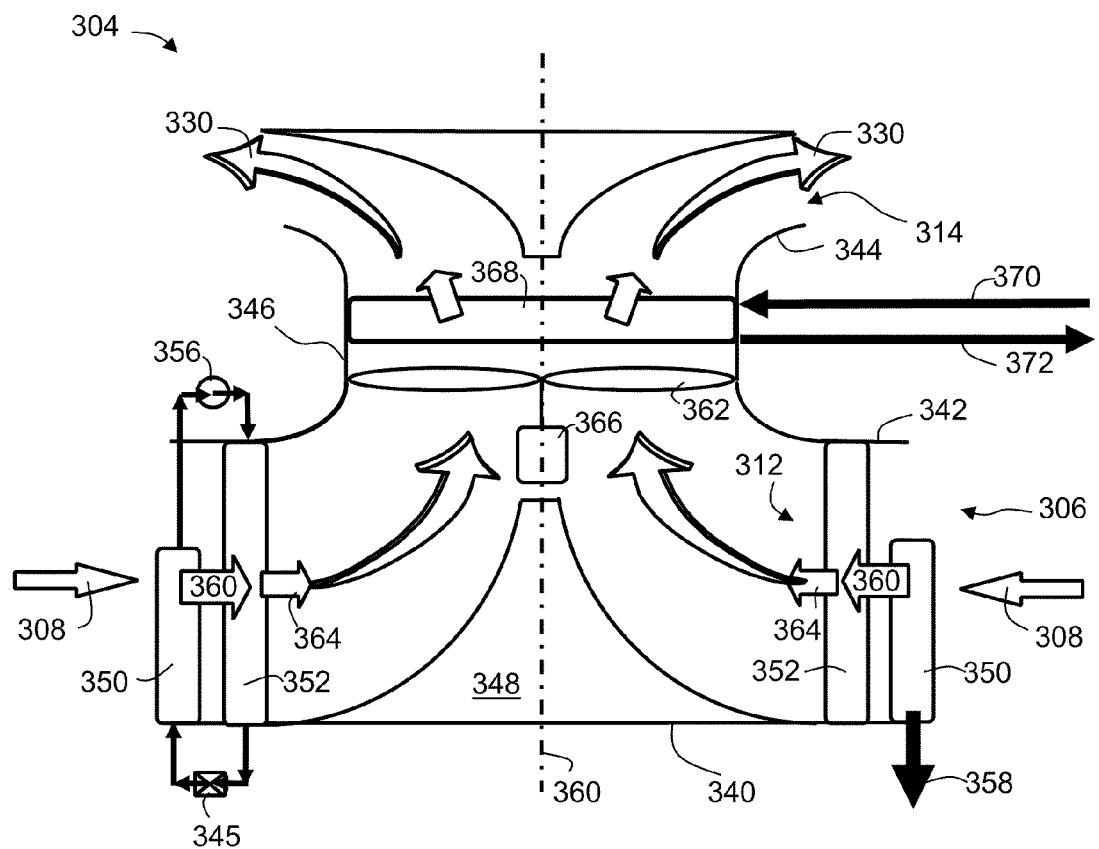

The air flow from evaporator 350 into condenser 352 and the air flow away from condenser 352 are not necessarily the same. FIGS. 5A and 5B illustrate embodiments in which substantially all the collected air 308 first passes at evaporator 350 and thereafter passes at condenser 352. This corresponds to embodiments in which the air flow at evaporator 350 is substantially the same as the air flow at condenser 352. FIG. 5C illustrates an embodiment in which part of air 308 passes at evaporator 350 and thereafter at condenser 352, while another part of air 308 passes at condenser 352 while bypassing evaporator 350. This corresponds to embodiments in which the air flow at evaporator 350 differs from the air flow at condenser 352. A psychrometric chart analysis can be employed for selecting the ratio between the air flows at evaporator 350 and condenser 352 so as to optimize the performance of apparatus 304 according to the desired level of dehumidification.

The dehumidified air can be pumped by a fan 362 driven by a motor 366 for releasing of the air via outlet section 344. Fan 362 can be housed in throat 346 of housing 340.

Figure 5D:
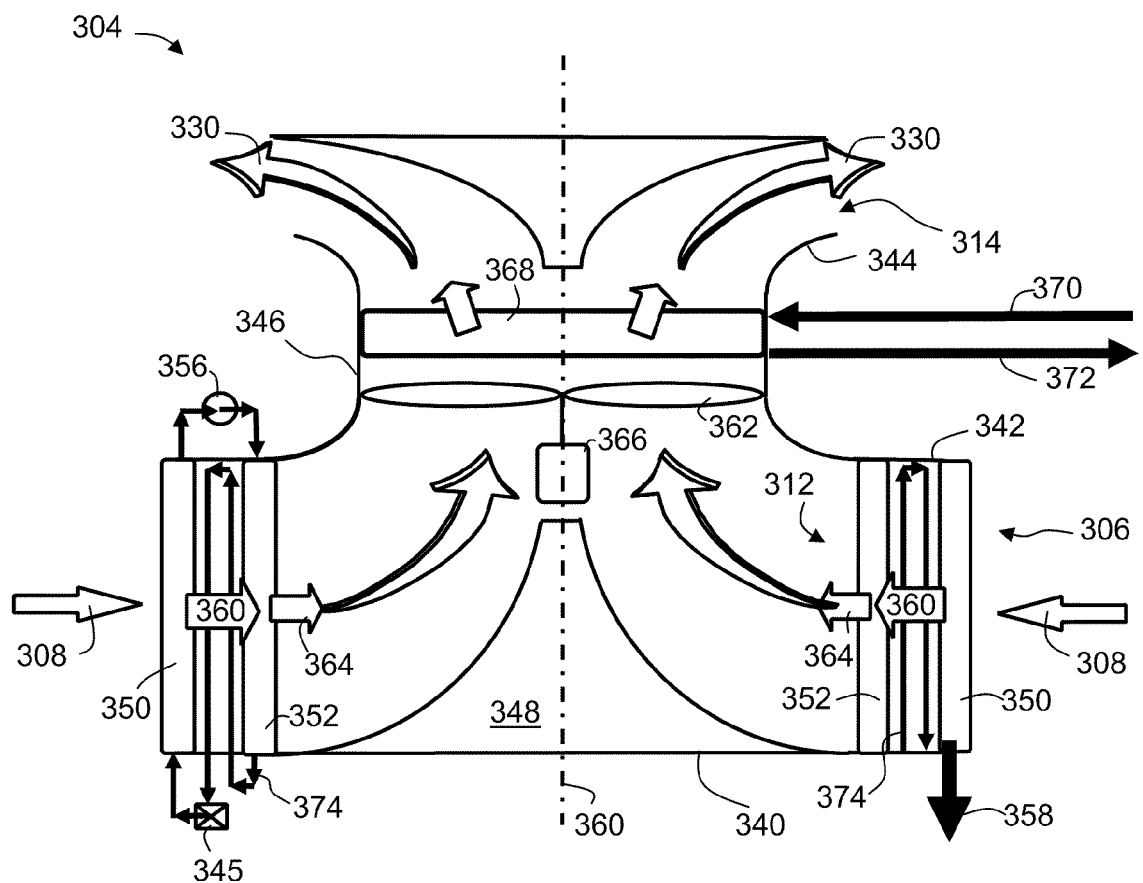

In various exemplary embodiments of the invention apparatus 304 comprises a heat exchanger 368 for further heating the air before returned to the enclosure via housing outlet 344. Heat exchanger 368 can be housed in throat section 346, as illustrated in FIGS. 5A, 5C and 5D, or it can be housed in inlet section 342 adjacent to condenser 352 as illustrated in FIG. 5B. When heat exchanger 368 is housed in throat section 346, fan 362 receives pre-heated but dehumidified air which flows away from condenser 352, and blows it away from the fan in the direction of heat exchanger 368. When heat exchanger 368 is housed in inlet section 342, fan 362 receives dehumidified and heated air flowing away from heat exchanger 368 and blows the air through outlet 314. Also contemplated are embodiments in which several heat exchangers 368 are employed, for example, one housed in throat section 346 and housed in inlet section 342.

Any heat source can be used for heat exchanger 368. In some embodiments of the present invention heat exchanger 368 is a liquid-type heat exchanger which is in fluid communication with liquid lines. Hot liquid entering heat exchanger 368 from an entry line 270 heats the heat exchanger 368 which in turns heats the air passing thereat. The cooled-off liquid is evacuated by an exit line 272. Other types of heat exchangers are not excluded from the scope of the present invention.

Evaporator 350 and condenser 352 can be of circular or toroidal configuration coaxial to each other. When heat exchanger 368 is adjacent to condenser 352 it can be also of circular or toroidal configuration coaxial with evaporator 350 and condenser 352. When, heat exchanger 368 is housed in throat section 346 it is preferably coaxial with housing axis 360.

FIG. 5D illustrates a configuration in which the refrigerant fluid exiting condenser 352 is further cooled by the cooled and dehumidified air 360 between evaporator 350 and condenser 352. In this embodiment, a refrigerant sub-circuit 374 can be deployed between evaporator 350 and condenser 352 in the flow path of air 360. The refrigerant fluid can be brought to flow out of condenser 352, through sub-circuit 374 and into evaporator 350, such that air 360 cools the refrigerant fluid prior to its entry into expansion valve 345 and evaporator 350. The advantage of this embodiment is that it increases the Coefficient Of Performance without increasing the temperature difference characterizing the thermal cycle.

Figure 5E:
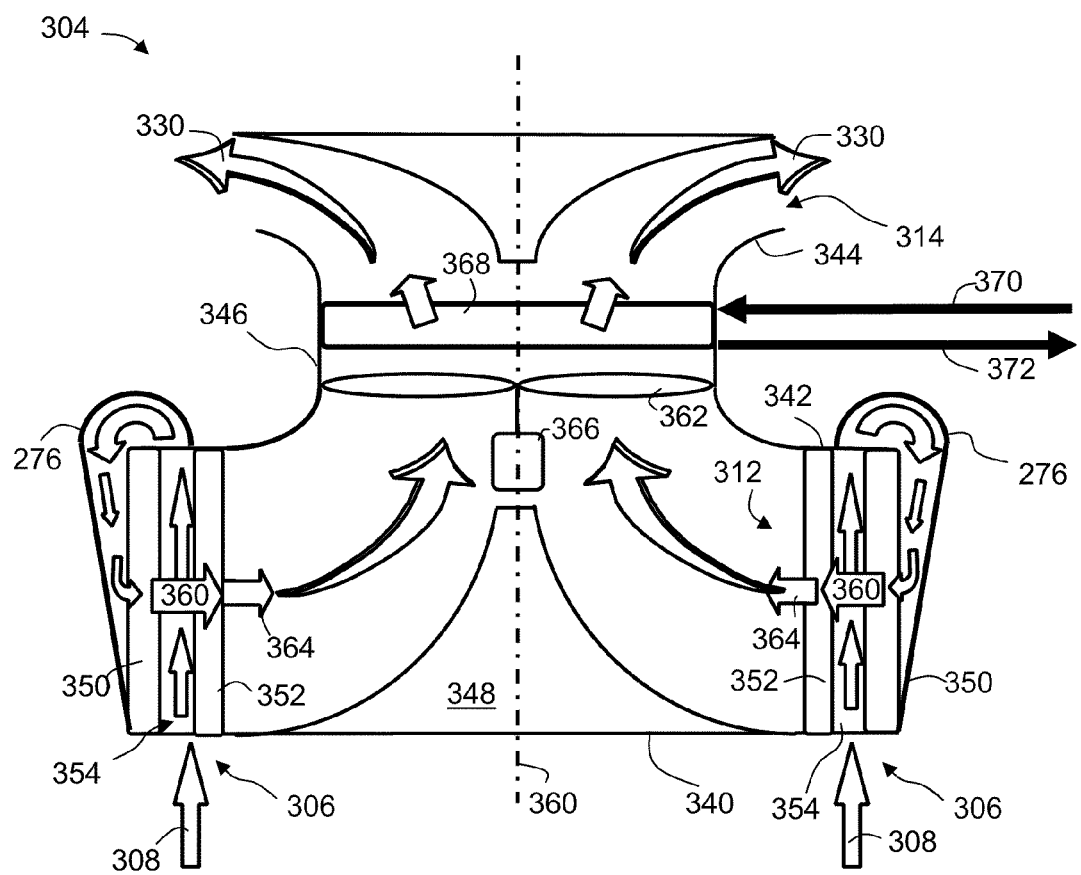

FIG. 5E illustrates a configuration in which the collected air 308 from the enclosure is pre-cooled by the cooled and dehumidified air 360 between evaporator 350 and condenser 352. The apparatus illustrated in FIG. 5E is basically the same as described above, and therefore the same reference numerals have been used to identify corresponding parts. Yet, for clarity of presentation several parts were omitted from the illustration of FIG. 5E. The modification is the location of inlet 306 at the bottom of inlet section 342 and the provision of by an air-to-air heat exchanger 354 between evaporator 350 and condenser 352. Another modification shown in FIG. 5E is the provision of an airflow path 276 for guiding air 308 therethrough. Air-to-air heat exchanger 354 is effective to pre-cool the air entering the apparatus from the enclosure by the cooled air exiting evaporator 350. Path 276 begins at inlet 306, passes at exchanger 354 and continues into the opposite side of evaporator 350 (away from condenser 352). Since path 276 intercepts with the flow path of air 360, the collected air 308 flowing in path 276 interacts with air 360 before it interacts with evaporator 250. Thus, the collected air is pre-cooled by air 360. The advantage of this embodiment is that it increases the efficiency of the dehumidification process.

Figure 5F:
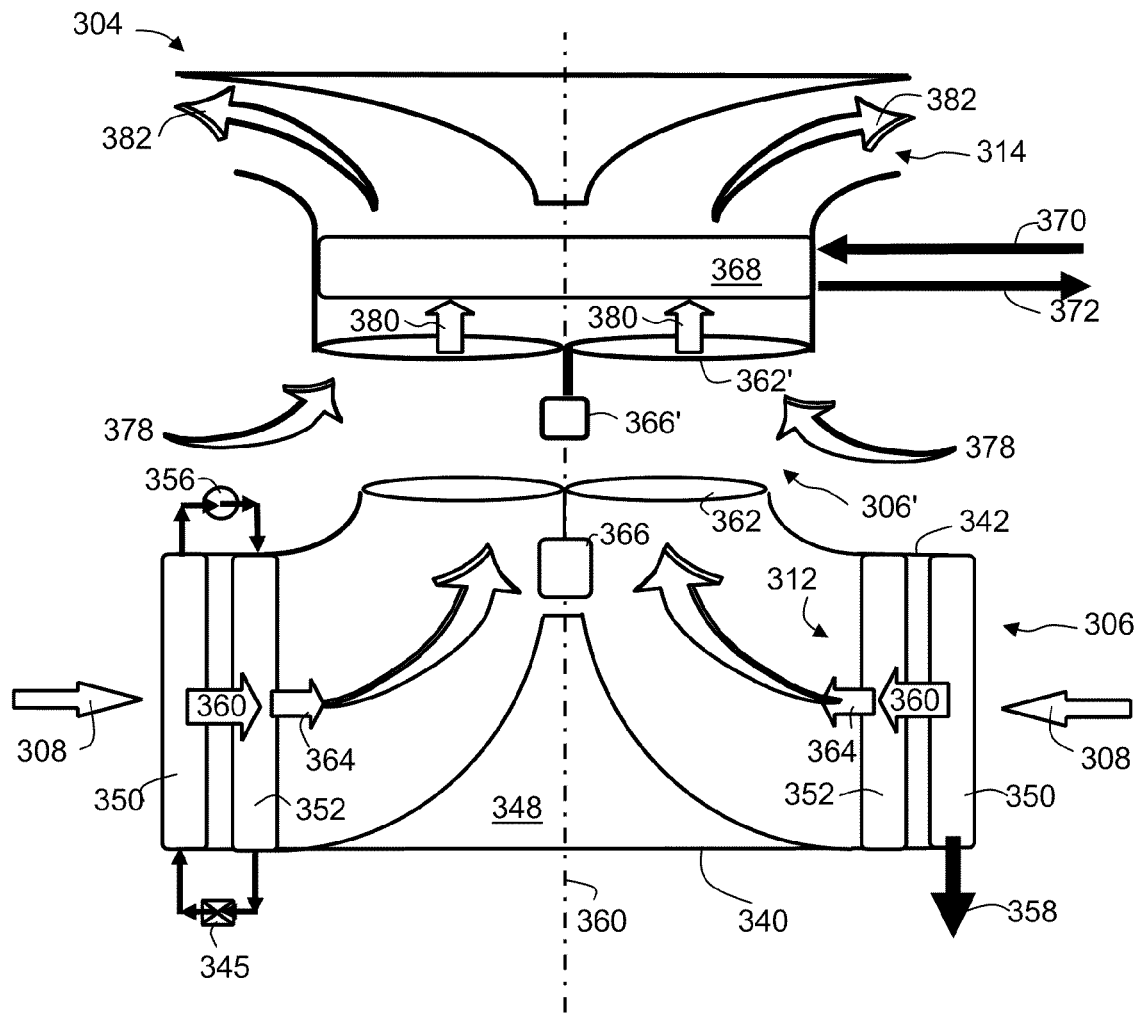
Figure 5G:
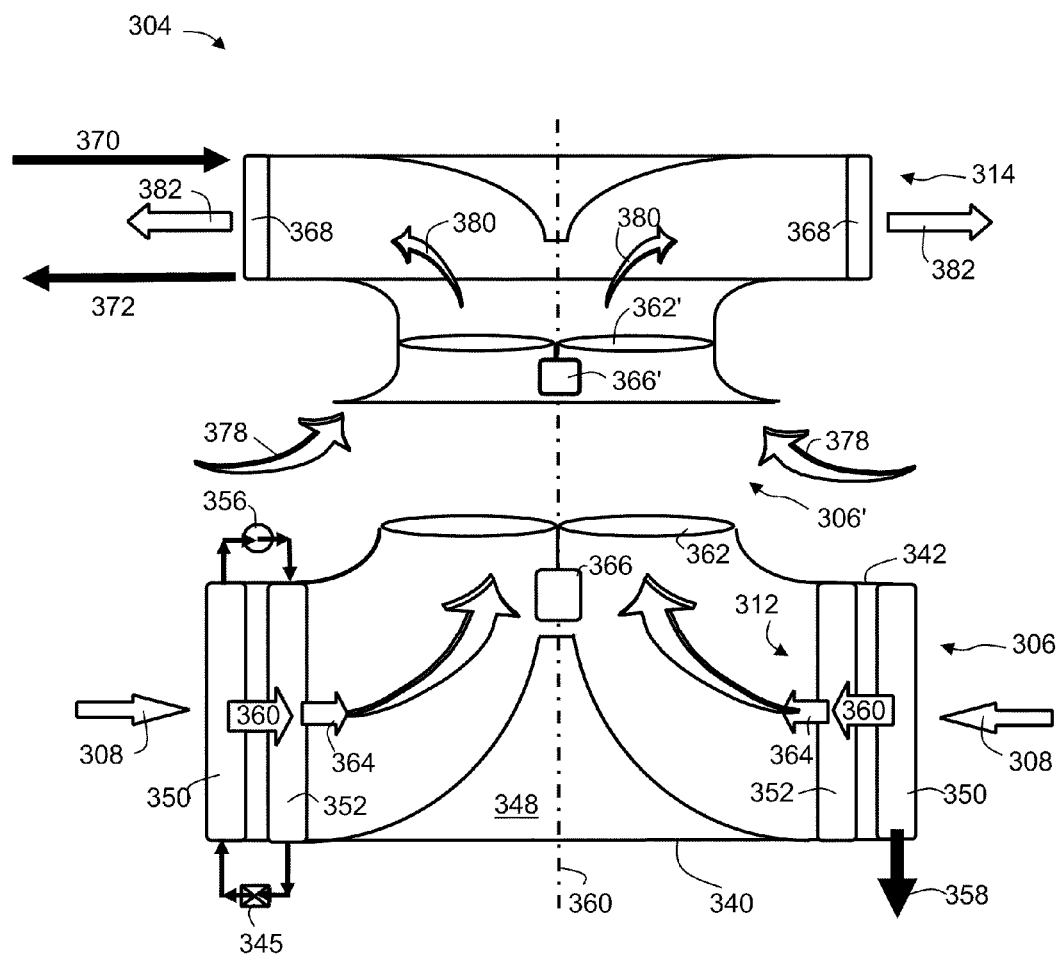

FIGS. 5F-G illustrate a configuration in which air 364 (the dehumidified air flowing away from condenser 352) is allowed to mix with air 378 from the interior of the enclosure. The mixture 380 of air 364 and air 378 passes at heat exchanger 368 for heating and the heated mixture 382 is released out of apparatus 304 via outlet 314. FIG. 5F illustrates an embodiment in which air 380 is heated by heat exchanger 368 and continuous to flow within outwardly-flared outlet section 344 prior to its return into the enclosure via outlet 314, and FIG. 5G illustrates an embodiment in which heat exchanger 368 is positioned at outlet 314.

In embodiments in which the air 364 is mixed with air 378 (such as those illustrated in FIGS. 5F-G), apparatus 304 preferably comprises an additional air inlet 306' through which air 378 from the enclosure enters. The suction of air 378 into the flow path of air 364 and the mixture between air 364 and air 378 can be facilitated by means of an additional fan 362' which can be derived by an additional motor 366'. In this embodiment, additional air inlet 306' is between fan 362 and fan 362'. The advantage of mixing air 364 with air 378 prior to the heating is that this configuration allow controls over the temperature difference between the released air 382 and the air in the enclosure at the vicinity of outlet 314. Such control prevents formation of a high temperature region near apparatus 304 hence facilitates better temperature distribution within the enclosure.

Figure 6:
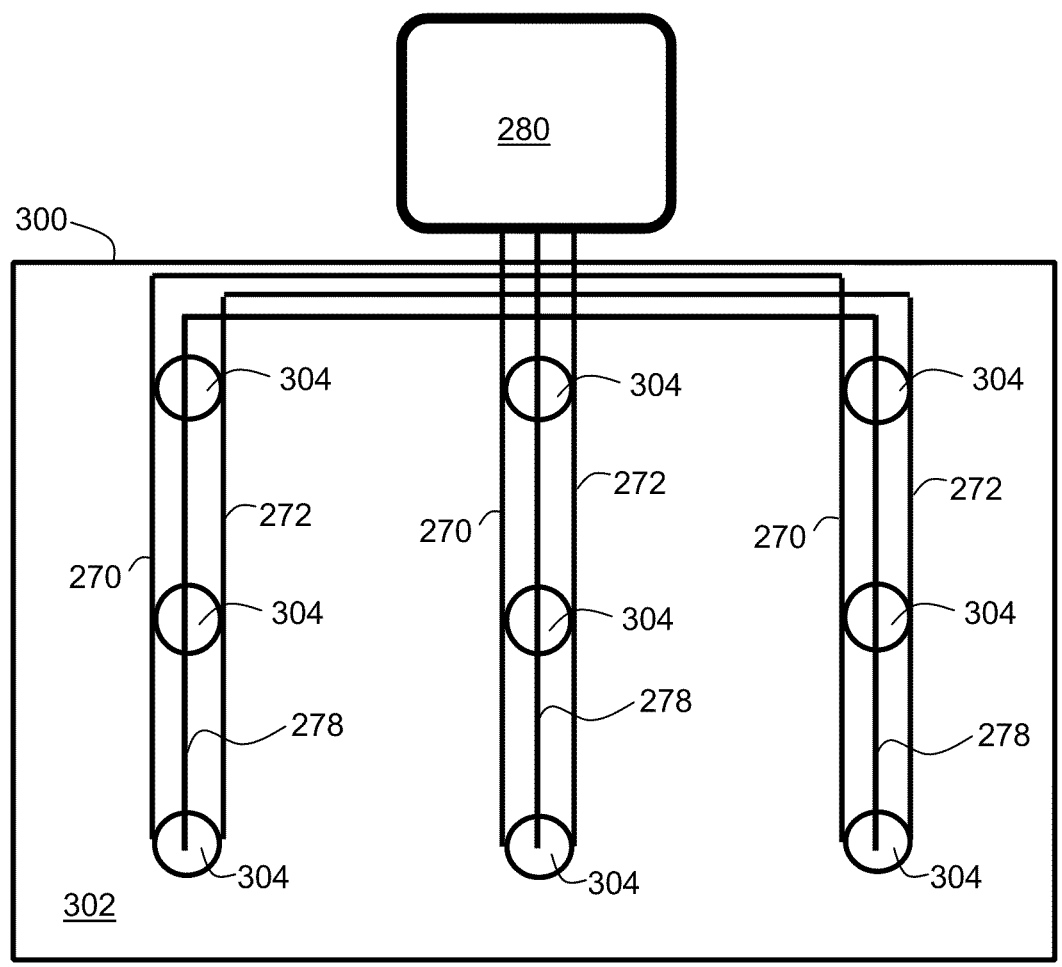
FIG. 6 is a schematic illustration of a top view of an enclosure in embodiments in which several apparatus are deployed, according to various exemplary embodiments of the present invention.

Several apparatus can be deployed in one enclosure so as to increase the effective over which the condition of the air is efficiently controlled. FIG. 6 is a schematic illustration of a top view of enclosure 300 in embodiments in which several apparatus similar to apparatus 304 are deployed within the interior of the enclosure. Shown in FIG. 6 are a plurality of apparatus 304, entry liquid lines 270 for delivery of thermal energy to the heat exchangers (not shown, see FIGS. 5A-E) of apparatus 304, exit liquid lines 272 for returning cooled-off liquid away from the heat exchangers, and power lines 278 for supplying power to apparatus 304 (e.g., for activating the compressor 356 and the like). A combined heat and power system 280, which can be positioned near enclosure 300 controls the supply of power and heat to the liquid and power lines.

It will be appreciated that such the method, apparatus and system of the present embodiments can also be used with respect to other types of enclosures, such as building structures, rooms in building structures etc., occupied by humans or animals. In such applications, it may be desirable to direct the heated and dehumidified air outletted from the air outlet system towards the lower part of the enclosure such that the air flows in the upward direction (rather than in the downward direction as in FIG. 3) in order to maximize drying of the lower portion of the enclosure occupied by the humans or animals It is expected that during the life of a patent maturing from this application many relevant dehumidifying technologies will be developed and the scope of the term dehumidifying unit is intended to include all such new technologies a priori.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find support in the following examples.

EXAMPLE

Reference is now made to the following examples, which together with the above descriptions illustrate some embodiments of the invention in a non limiting fashion.

Economic calculations for embodiments in which the enclosure is a greenhouse were performed by the present Inventor based on the following assumptions:

One apparatus per 1000 m² of greenhouse area.

Desired conditions in a greenhouse, about 18° C. and relative humidity of about 80%.

Plant transpiration flow: about 40 g/m² per hour.

Fuel cost: about USD 600 per ton.

Power cost: about USD 0.1 per kWh.

Coefficient of Performance (COP) of the dehumidifying cycle: about 6.

The avoidance of air replacement to remove excess humidity, in accordance with preferred embodiments of the present invention, is equivalent to about 6 l/h per 1000 m² of greenhouse, which is about 8.7 tons of fuel per season (1440 hours) under semi-arid conditions, by electrical energy investment of 14,400 kWh, which is equivalent to additional heating input of 1.5 ton of fuel.

The annual number of heating hours may vary around the world, within the range of 1000 (hot areas) to 3000 (cold areas).

In addition, In some embodiments of the present invention, there is significant decrease in greenhouse gas ($CO_2$) emissions: for every ton of fuel saved the emission of 3 tons of greenhouse gases is prevented.

The contribution of the technique according to some embodiments of the present invention, has been estimated, for Israeli conditions, by comparison between a control greenhouse in which the desired conditions (without wetting) are maintained by means of night-time heating and ventilation, and a greenhouse in which the technique of the present embodiments is employed. The estimate was made for two thermal screens that enable energy saving of 40 and 60% (referred to hereinafter as assembly I and assembly II, respectively). The results are summarized in Table 1.

TABLE 1

| | Fuel consumption (tons per season) | Additional electricity consumption (kWh per season) | Fuel consumption (%) |
|---|---|---|---|
| Control | 20-24 | 0 | 100 |
| Assembly I | 6-9 | 14400 | 25-45 |
| Assembly II | 3.5-5 | 14000 | 15-25 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of controlling the conditions of air in an interior of a greenhouse enclosure for growing plants, comprising collecting air from a lower part of the interior, dehumidifying said collected air, releasing said dehumidified air in an upper part of the interior, and circulating said dehumidified air within the greenhouse enclosure in the vicinity of the foliage of the plants, the method being executed substantially without replacing air in the interior of the greenhouse with air in the exterior of the greenhouse, thereby controlling the conditions of the air in the interior of the greenhouse enclosure.

2. The method of claim 1, further comprising reducing or preventing transport of thermal energy through an overhead wall of the greenhouse enclosure.

3. The method of claim 2, further comprising reflecting thermal radiation off a thermal screen overlaying said interior beneath said overhead wall.

4. The method of claim 1, further comprising heating said dehumidified air prior to said release of said air in said upper part of the interior.

5. The method of claim 1, wherein said dehumidifying comprises using a dehumidifying unit circulating a refrigerant fluid therein, said unit having an evaporator at which said refrigerant fluid is evaporated and a condenser at which said refrigerant fluid is condensed, wherein said air is cooled and dehumidified by said evaporator and heated by said condenser.

6. The method of claim 1, wherein said air is collected and released so as to maintain, at all times, an average temperature which is lower at said lower part than at said upper part.

7. The method of claim 5, wherein said dehumidifying unit is a heating and dehumidifying unit which comprises a heat exchanger for heating said dehumidified air prior to said release of said air in said upper part of the interior.

8. The method of claim 5, wherein said dehumidifying unit comprises a fan and is housed in a housing which comprises an outwardly-flaring inlet, an outwardly-flaring outlet, and an interconnecting relatively narrow throat, said outwardly-flaring inlet housing said evaporator and said condenser, and said narrow throat housing said fan.

9. The method of claim 7, wherein said air is circulated in the interior of the greenhouse enclosure through said heating and dehumidifying unit by means of a fan positioned in said unit.

10. The method of claim 5, wherein a refrigerant fluid exiting said condenser is further cooled by air between said evaporator and said condenser.

11. The method of claim 5, wherein air from the greenhouse enclosure entering said evaporator is pre-cooled by air between said evaporator and said condenser.

12. The method of claim 7, wherein said dehumidified air is mixed with air from the greenhouse enclosure to provide a mixture, and wherein said mixture is heated by said heat exchanger.

13. The method of claim 1, further comprising sealing an overhead wall and side walls of the greenhouse enclosure so as to prevent penetration of air and water vapor therethrough.

14. The method of claim 1, wherein said circulation is such as to establish motion of hot air mainly along the horizontal direction at said upper part and cold air mainly along said horizontal direction at said lower part.

15. A system for growing plants, comprising:
a greenhouse enclosure having an interior being generally isolated from the environment such as to substantially prevent exchange of air between said interior and said environment; and
apparatus positioned within said interior and configured for controlling the conditions of air in said interior while said exchange is substantially prevented, said apparatus comprising,
an air inlet constituted for collecting air from a lower part of the interior,
a dehumidifying unit for dehumidifying said collected air, and
an air outlet constituted for releasing said dehumidified air in an upper part of the interior and circulating said dehumidified air within the greenhouse enclosure in the vicinity of the foliage of the plants.

16. The system according to claim 15, comprising a plurality of apparatus for controlling the conditions of air in said interior, wherein said apparatus are deployed within said interior.

17. The system of claim 15, wherein said greenhouse enclosure comprises a thermal screen overlaying said greenhouse enclosure and being constituted for reducing or preventing transport of thermal energy through said thermal screen.

18. The system of claim 17, wherein said thermal screen is thermally reflective so as to reflect thermal radiation.

19. The system of claim 15, wherein said dehumidifying unit circulates a refrigerant fluid therein and comprises an evaporator at which said refrigerant fluid is evaporated and a condenser at which said refrigerant fluid is condensed, wherein said collected air is dehumidified and cooled by said evaporator, and wherein said dehumidified and cooled air is heated by said condenser.

* * * * *